(12) United States Patent
Shim et al.

(10) Patent No.: US 8,972,357 B2
(45) Date of Patent: Mar. 3, 2015

(54) SYSTEM AND METHOD FOR DATA COLLECTION TO VALIDATE LOCATION DATA

(75) Inventors: David Shim, Seattle, WA (US); Brad Bicknell, Seattle, WA (US); George Varghese, Kirkland, WA (US); Nick Gerner, Seattle, WA (US); Weilie Yi, Bellevue, WA (US)

(73) Assignee: Placed, Inc., Seattle, WA (US)

( * ) Notice: Subject to any disclaimer, the term of this patent is extended or adjusted under 35 U.S.C. 154(b) by 0 days.

(21) Appl. No.: 13/405,182

(22) Filed: Feb. 24, 2012

(65) Prior Publication Data

US 2013/0225202 A1 Aug. 29, 2013

(51) Int. Cl.
*G06F 7/00* (2006.01)
*G06F 17/00* (2006.01)

(52) U.S. Cl.
USPC .................. 707/690; 707/691; 455/456.3

(58) Field of Classification Search
None
See application file for complete search history.

(56) References Cited

U.S. PATENT DOCUMENTS

| | | | |
|---|---|---|---|
| 7,349,768 B2 | 3/2008 | Bruce et al. | |
| 7,454,442 B2 | 11/2008 | Cobleigh et al. | |
| 7,650,231 B2 | 1/2010 | Gadler | |
| 7,966,658 B2 | 6/2011 | Singh et al. | |
| 8,010,685 B2 | 8/2011 | Singh et al. | |
| 8,090,351 B2 | 1/2012 | Klein | |
| 8,200,247 B1 * | 6/2012 | Starenky et al. | 455/456.3 |
| 8,220,034 B2 * | 7/2012 | Hahn et al. | 726/5 |
| 8,229,458 B2 * | 7/2012 | Busch | 455/456.1 |
| 8,509,761 B2 * | 8/2013 | Krinsky et al. | 455/421 |
| 8,588,942 B2 | 11/2013 | Agrawal | |
| 8,594,680 B2 | 11/2013 | Ledlie et al. | |
| 8,613,089 B1 | 12/2013 | Holloway et al. | |
| 2007/0244633 A1 * | 10/2007 | Phillips et al. | 701/207 |
| 2009/0276235 A1 * | 11/2009 | Benezra et al. | 705/1 |
| 2010/0161720 A1 * | 6/2010 | Colligan et al. | 709/203 |
| 2010/0223346 A1 * | 9/2010 | Dragt | 709/206 |
| 2010/0257036 A1 * | 10/2010 | Khojastepour et al. | 705/14.11 |
| 2011/0076653 A1 * | 3/2011 | Culligan et al. | 434/157 |
| 2011/0099046 A1 | 4/2011 | Weiss et al. | |
| 2011/0099047 A1 | 4/2011 | Weiss et al. | |
| 2011/0099048 A1 | 4/2011 | Weiss et al. | |
| 2012/0246004 A1 * | 9/2012 | Book et al. | 705/14.58 |
| 2012/0264446 A1 * | 10/2012 | Xie et al. | 455/456.1 |

\* cited by examiner

*Primary Examiner* — Magdi Elhag

(74) *Attorney, Agent, or Firm* — Perkins Coie LLP

(57) ABSTRACT

A data collection system that provides the means to collect, store and make data available for a location analytics inference pipeline. The system incorporates a feedback mechanism enabling algorithms produced from the inference pipeline to drive the collection strategy to yield higher data quality and to produce reference data for model validation.

31 Claims, 17 Drawing Sheets

SYSTEM AND METHOD FOR DATA COLLECTION TO VALIDATE LOCATION DATA

CROSS-REFERENCE TO RELATED APPLICATION

This application is related to U.S. application Ser. No. 13/405,190 filed concurrently, entitled "INFERENCE PIPELINE SYSTEM AND METHOD" which is fully incorporated by reference.

BACKGROUND

There are a variety of existing technologies which track and monitor location data. One example is a Global Positioning Satellite (GPS) system which captures location information at regular intervals from earth-orbiting satellites. Another example is radio frequency identification (RFID) systems which identify and track the location of assets and inventory by affixing a small microchip or tag to an object or person being tracked.

Additional technologies exist which use geographical positioning to provide information or entertainment services based on a user's location. In one example, an individual uses a mobile device to identify the nearest ATM or restaurant based on his or her current location. Another example is the delivery of targeted advertising or promotions to individuals whom are near a particular eating or retail establishment.

The need exists for systems and methods for collecting data that validates location data based on a variety of information sources, as well as provide additional benefits. Overall, the examples herein of some prior or related systems and their associated limitations are intended to be illustrative and not exclusive. Other limitations of existing or prior systems will be become apparent to those skilled in the art upon reading the following Detailed Description.

BRIEF DESCRIPTION OF THE DRAWINGS

The details of one or more implementations are set forth in the accompanying drawings and the description below. Further features of the invention, its nature and various advantages, will be apparent from the following detailed description and drawings, and from the claims.

Examples of a system and method for a data collection system are illustrated in the figures. The examples and figures are illustrative rather than limiting.

FIG. 17 depicts an example user interface whereby a user may configure a profile and service(s) to register a sign-in.

DETAILED DESCRIPTION

Figure 1:
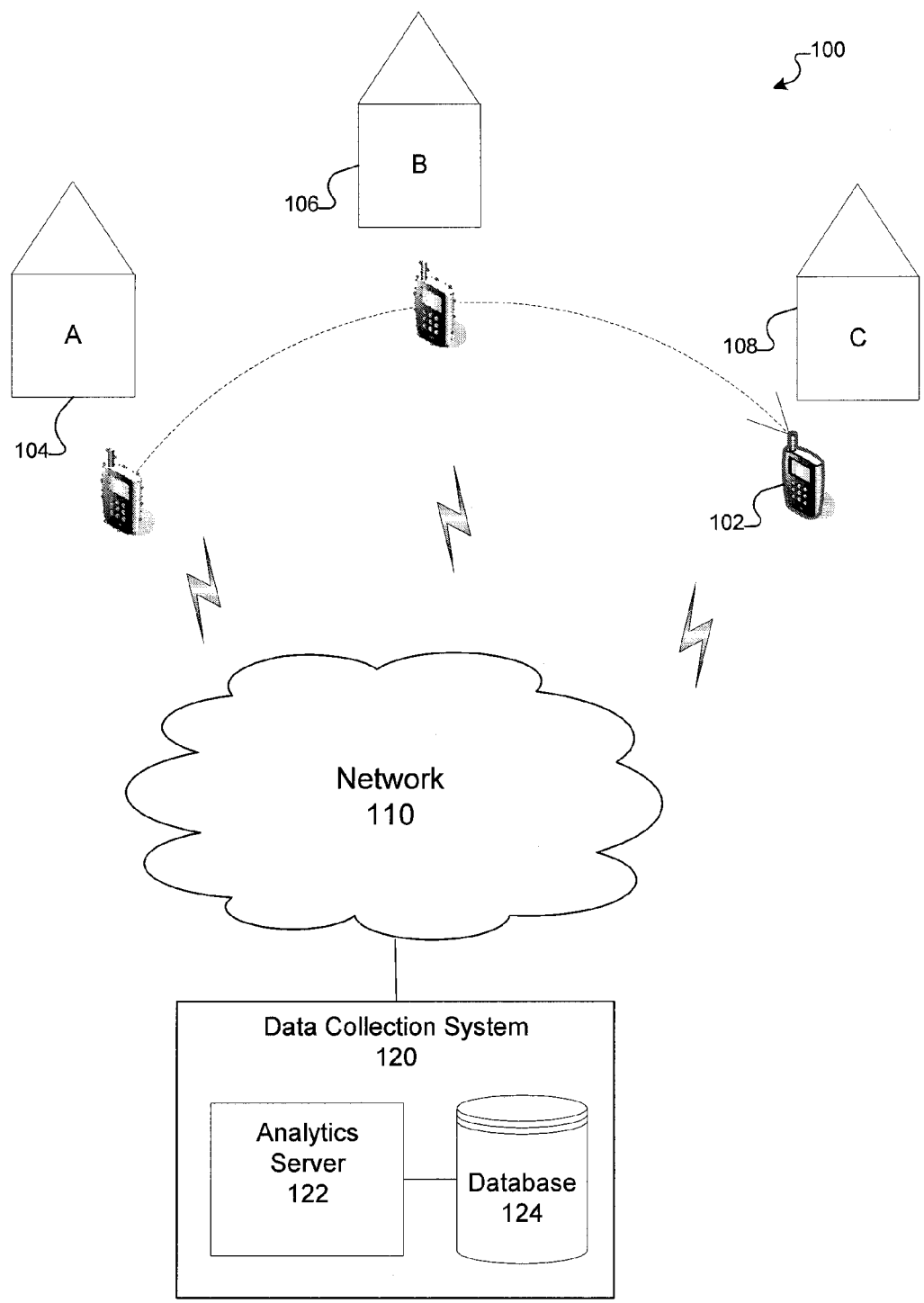
FIG. 1 depicts an example environment in which one implementation of the data collection system can operate.

In existing systems, both user data and place data are noisy. User location data can be noisy due to poor GPS reception, poor Wi-Fi reception, or weak cell phone signals. Similarly, mobile electronic devices can lack certain types of sensors or have low quality sensor readings. In the same way, the absence of a comprehensive database of places with large coverage and accurate location information causes place data to also be noisy.

A system and method for collecting and validating location data from a mobile device are described herein that overcome at least the above limitations and provide additional benefits. The data collection system gathers data and measurements from a user's mobile device. Using various sources, the data collection system can directly and indirectly validate location data. One way location data can be validated is by directly querying the user of the mobile device. For example, a survey question may appear on the user's device which prompts him or her to confirm a location. Another way location data can be validated is through indirect sources such as third-party websites, sensor measurements, and user activity.

The data collection system can gather relevant data via bulk import from third-parties. The data collected includes profile data, such as user account information, demographics, user preferences, etc. and observation data, such as location, sensor, device information, and activity streams, reference data, answers to survey questions, etc. The data collection system supports a feedback mechanism that pushes data to devices and is used for tuning the data collection strategy.

In some cases, the data collection system is part of a larger platform for determining a user's location. For example, the data collection system can be coupled to an inference pipeline which further processes location information. Additional details of the inference pipeline can be found in the assignee's concurrently filed U.S. patent application Ser. No. 13/405, 190.

The data collection system can include an analytics agent. In one implementation, this analytics agent includes an application programming interface (API) that can easily be integrated with any device and referenced by a third-party. The API facilitates the data collection by abstracting the underlying implementation details of data collection specific to a device. An example of this API is referred to sometimes herein as a Placed™ Agent. An analytics agent can collect device data including location and sensor data from a device and make this data available for an inference pipeline. This data may be high volume de-normalized Observation Data (described below) that may be stored in any data storage.

The analytics agent can also collect user and device information that can be used to identify the source of each data observation. This profile data may be stored in any data storage. The analytics agent also exposes public interfaces which in turn become reference data. This data may be used for the training and validation of models in an inference pipeline.

The analytics agent is can be easily integrated with any device. This allows exponential growth of data collection as the analytics agent is integrated with devices by third-parties. These third-parties include software developers on mobile devices, web application developers, device manufacturers, service providers including mobile carriers, in addition to any company or organization that incorporates location into their offering.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

FIG. 1 and the following discussion provide a brief, general description of a representative environment 100 in which a data collection system 120 can operate. A user device 102 is shown which moves from one location to another. As an example, user device 102 moves from a location A 104 to location B 106 to location C 108. The user device 102 may be any suitable device for sending and receiving communications and may represent various electronic systems, such as personal computers, laptop computers, tablet computers, mobile phones, mobile gaming devices, or the like. Those skilled in the relevant art will appreciate that aspects of the invention can be practiced with other communications, data processing, or computer system configurations, including: Internet appliances, hand-held devices [including personal digital assistants (PDAs)], wearable computers, all manner of cellular or mobile phones [including Voice over IP (VoIP) phones], dumb terminals, media players, gaming devices, multi-processor systems, microprocessor-based or programmable consumer electronics, and the like.

As the user device 102 changes locations, the data collection system 120 collects and validates information through a communication network 110. Network 110 is capable of providing wireless communications using any suitable short-range or long-range communications protocol (e.g., a wireless communications infrastructure including communications towers and telecommunications servers). In other implementations, network 110 may support Wi-Fi (e.g., 802.11 protocol), Bluetooth, high-frequency systems (3.g., 900 MHz, 2.4 GHz, and 5.6 GHz communication systems), infrared, or other relatively localized wireless communication protocol, or any combination thereof. As such, any suitable circuitry, device, and/or system operative to create a communications network may be used to create network 110. In some implementations, network 110 supports protocols used by wireless and cellular phones. Such protocols may include, for example, 2G, 3G, 4G, and other cellular protocols. Network 110 also supports long range communication protocols (e.g., Wi-Fi) and protocols for placing and receiving calls using VoIP or LAN.

As will be described in additional detail herein, the data collection system 120 comprises of an analytics server 122 coupled to a database 124. Indeed, the terms "system." "platform," "server," "host," "infrastructure," and the like are generally used interchangeably herein, and may refer to any computing device or system or any data processor.

1. INTRODUCTION

Before describing the data collection and storage strategy of the data collection system, the characteristics of this data is first described.

Figure 2:
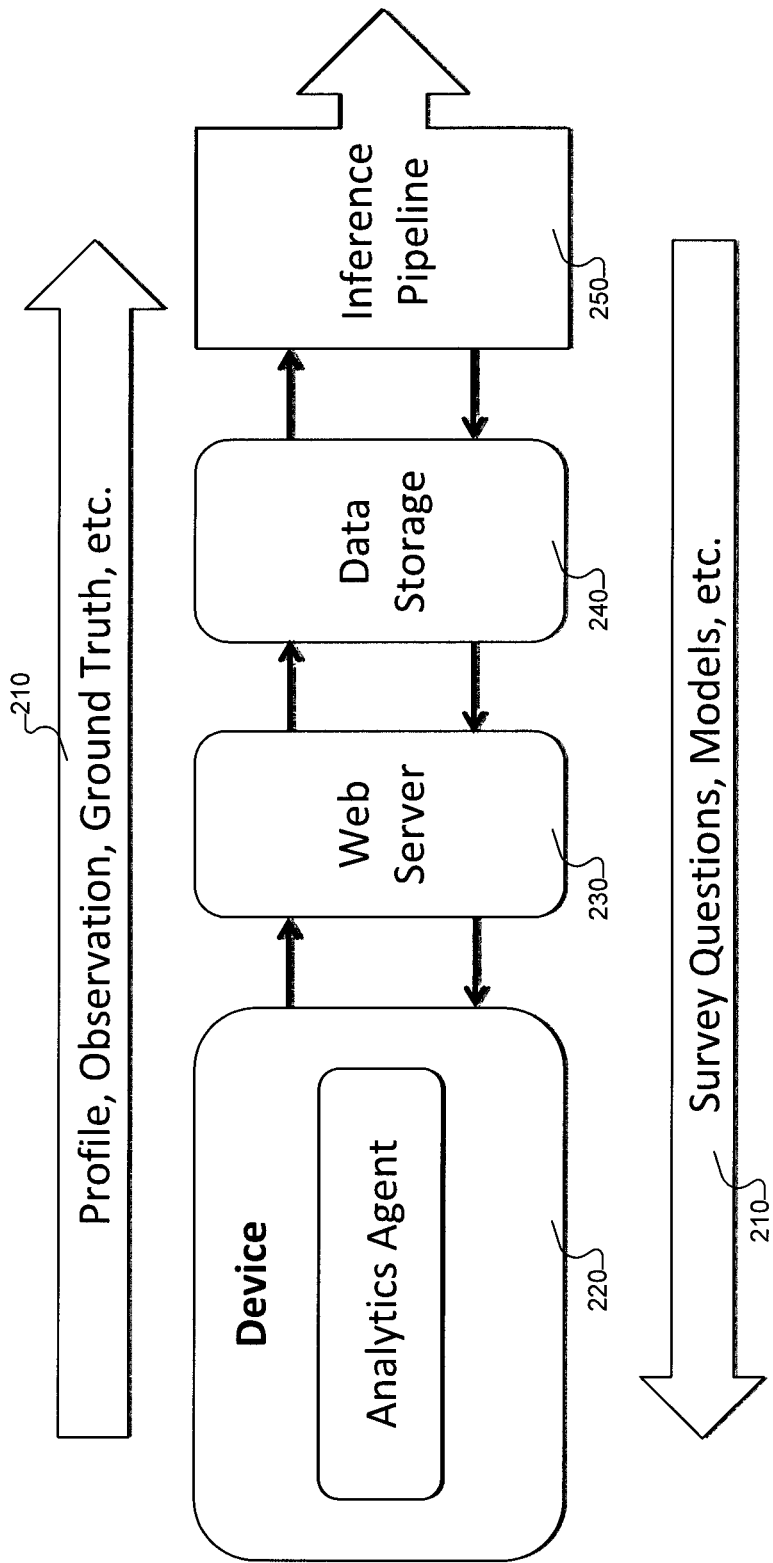
FIG. 2 depicts a high-level representation of data flow in the data collection system.

FIG. 2 illustrates a high-level representation of data flow 210 in the data collection system, as between a user device (including an analytics agent) 220, web server 230, data storage 240, and an inference pipeline 250. On a user device (e.g., 102), an analytics agent collects relevant data. The data may be stored anywhere and made available for an inference pipeline. There is a feedback loop that drives the data collection strategy based on models generated by the inference pipeline.

This feedback technique provides a means of collecting validation data for the models used in the inference pipeline.

2. THE DATA 2.1 Profile Data

This broadly includes data about the user and device.

2.1.1 User Data

This is data that provides details about the characteristics of the user. This includes, but is not limited, the user contact information, preferences, demographics, etc. This data can be combined with observation data to generate critical location based analytics.

Demographics include age, gender, income, education, relationship status, ethnicity, and a range of other characteristics that can be leveraged when analyzing observation data stream of the user.

2.1.2 Device Data

This is data that provides more details about the characteristics of the device. This includes the device identifiers, configuration, etc.

Since there could be multiple identifiers that can be associated with a device, all available identifiers are collected from the device.

2.2 Observations

Figure 3:
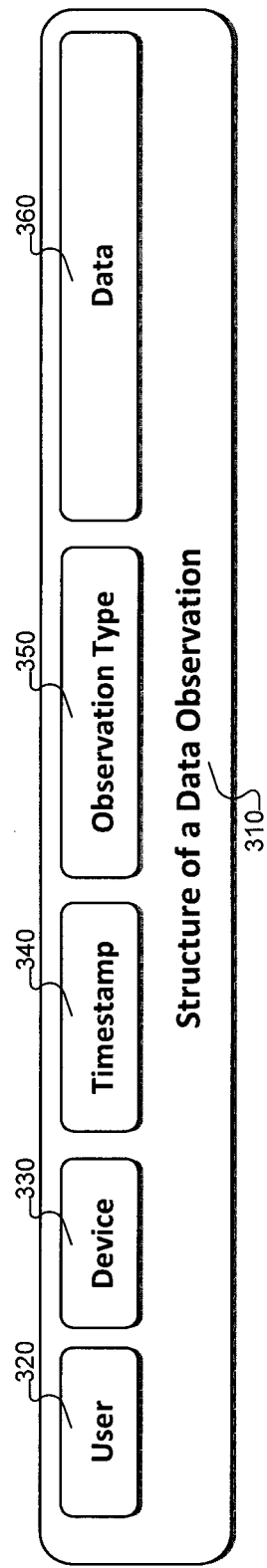
FIG. 3 depicts an example structure of observation data.

This broadly includes data that is collected from the device. The type of the observation could be a location, sensor, reference, etc. As shown in FIG. 3, the structure of observation data may be packed into data packets and transmitted to the analytics server.

FIG. 3 explains the components of an observation data packet 310 that links the data 360 collected from the device to a user 320 and device 330. It associates the data with the timestamp 340 when the data was observed and the type of data 350.

2.2.1 Location

This data is associated with the location of a device includes the latitude, longitude, altitude, accuracy of measurement, bearing, speed, etc. of the device.

Device provides location data from various sources including GPS, cell tower ID, Wi-Fi, Bluetooth, geolocation tagged images, temperature, light, sound, assisted GPS. Third-parties provide access to bulk feeds of location-related data.

2.2.2 Sensor

This data is associated with measurements from device sensors that include acceleration, magnetic orientation, proximity, light intensity, battery status, gyroscope, temperature, etc. The data collection system is also set up to collect sensor data that includes reading from the device accelerometer, compass, gyroscope, light detection, motion, etc. Data from one or more sensor readings can be used to determine the user activity or situation.

In one implementation, data from the accelerometer and gyroscope can indicate that a user is walking, running, biking, driving, etc., or that the user is inside versus outside based on natural daylight and dark or dim interior lights.

This data could be made available to an inference pipeline in a raw form of sensor measurements, or a derived form as hints to user behavior.

Advanced usage of these sensor readings include utilizing Bluetooth detection, temperature, weather, zip code, high-frequency audio/sound, WiFi points, altitude, proximity, etc. to derive a more accurate insight into the location of a user.

2.2.3 Reference Data

In order to validate the results generated by an inference model, reference data is collected. Reference data includes accurate observations that link a user with a place at an instance of time. This data is used to train and validate the inference models downstream for improved accuracy of prediction.

The following sections describe what is included in reference data.

2.2.4 Data Collected Directly from the User:

2.2.4.1 Place Queries

The data collection system collects location data from the device. In order to collect candidate places that correspond to this location data, the data collection system utilizes services that enable users to register a visit to a specific place and time.

A service includes a data source that provides contextual data associated with a location. This contextual data can include information about places nearby a location, along with characteristics of the places. Different services will have variations on what is considered to be in a user's vicinity.

To aid the user in the identification of the various candidate places in the vicinity, a service allows a user to search for places of interest in the user's vicinity. When the user conducts a search for places in his vicinity, the data collection system extracts the results of the search from a service and sends these place-query results along with the location where the query was made back to the data collection system.

Figure 4:
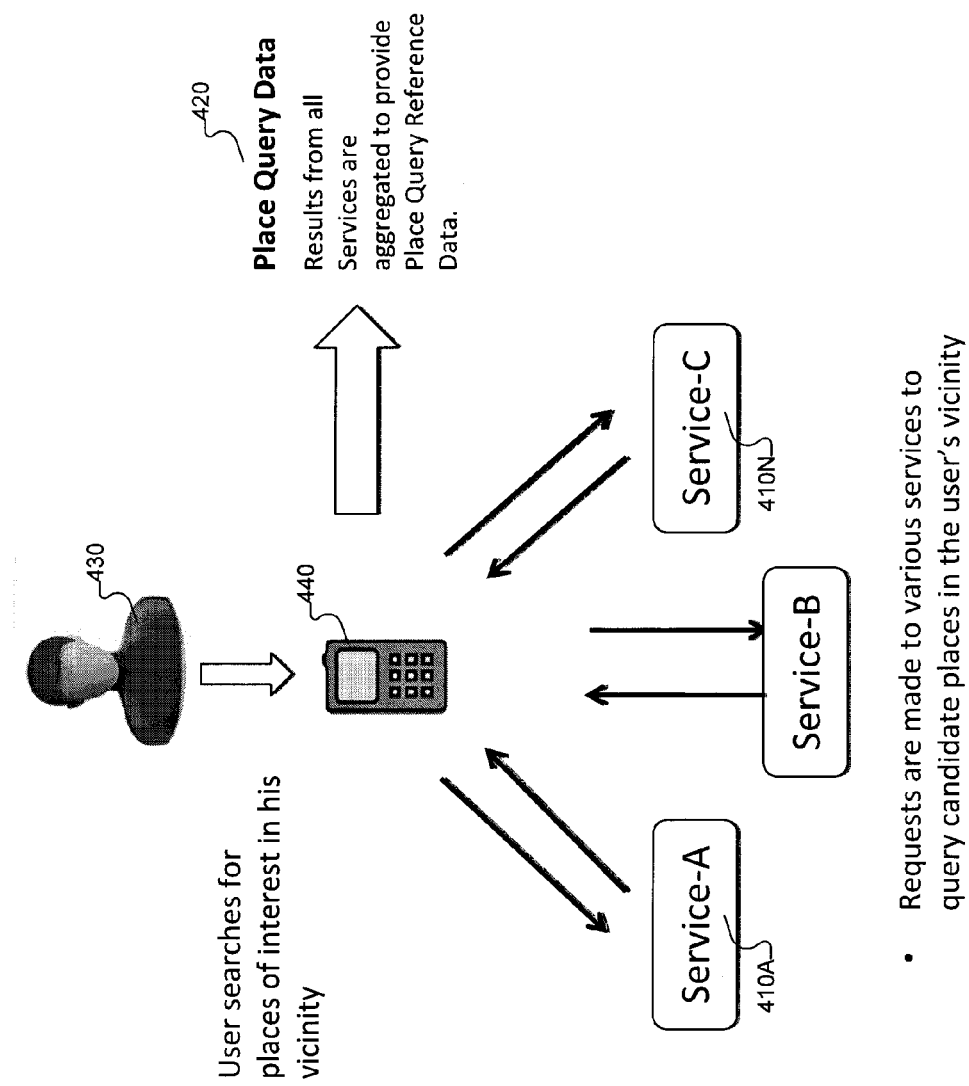
FIG. 4 depicts example user interactions with various services whereby place query data can be collected.

FIG. 4 illustrates example user interactions on with various services 410A-N whereby place query data 420 can be collected. As shown in FIG. 4, when a user 430 requests for nearby places an electronic device 440, multiple services retrieve candidate places in the user's vicinity.

Figure 5:
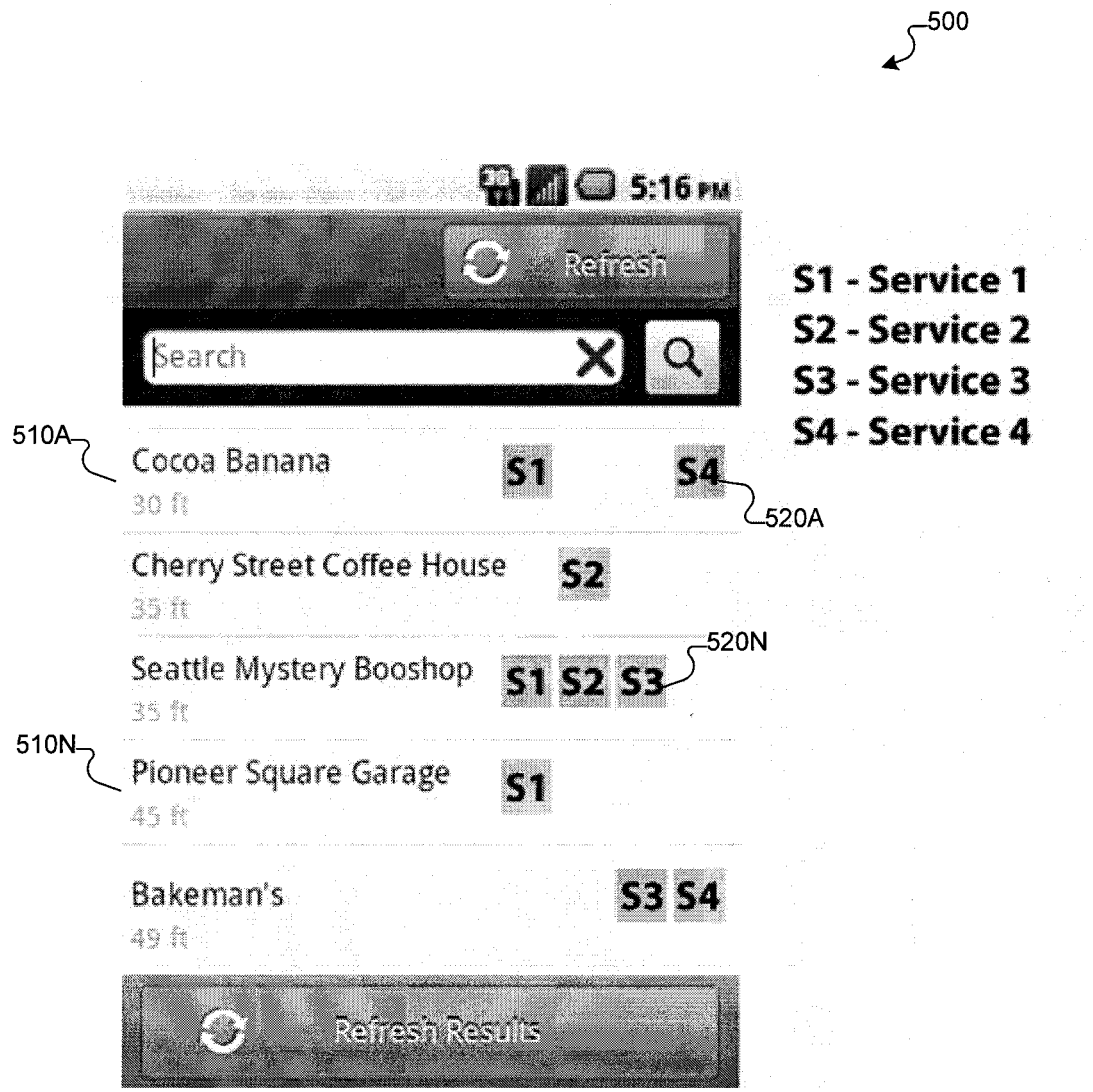
FIG. 5 depicts an example user interface that represents the search query results from various services.

FIG. 5 shows an example user interface 500 that represents the search query results 510A-N from various services 520A-N. These results are then aggregated and associated with the user's location, and can produce place query reference data for the inference pipeline.

2.2.4.2 Place Confirmation

After users request contextual data based on their location from services, they review the list of places, and confirm the actual place associated with their location. If a place is not listed, the user has the ability to manually add a place. The data collection system associates the confirmed place with the location data at and around the time of place confirmation. The data collected as part of a place confirmation can be made available as reference data for an inference pipeline.

Figure 6:
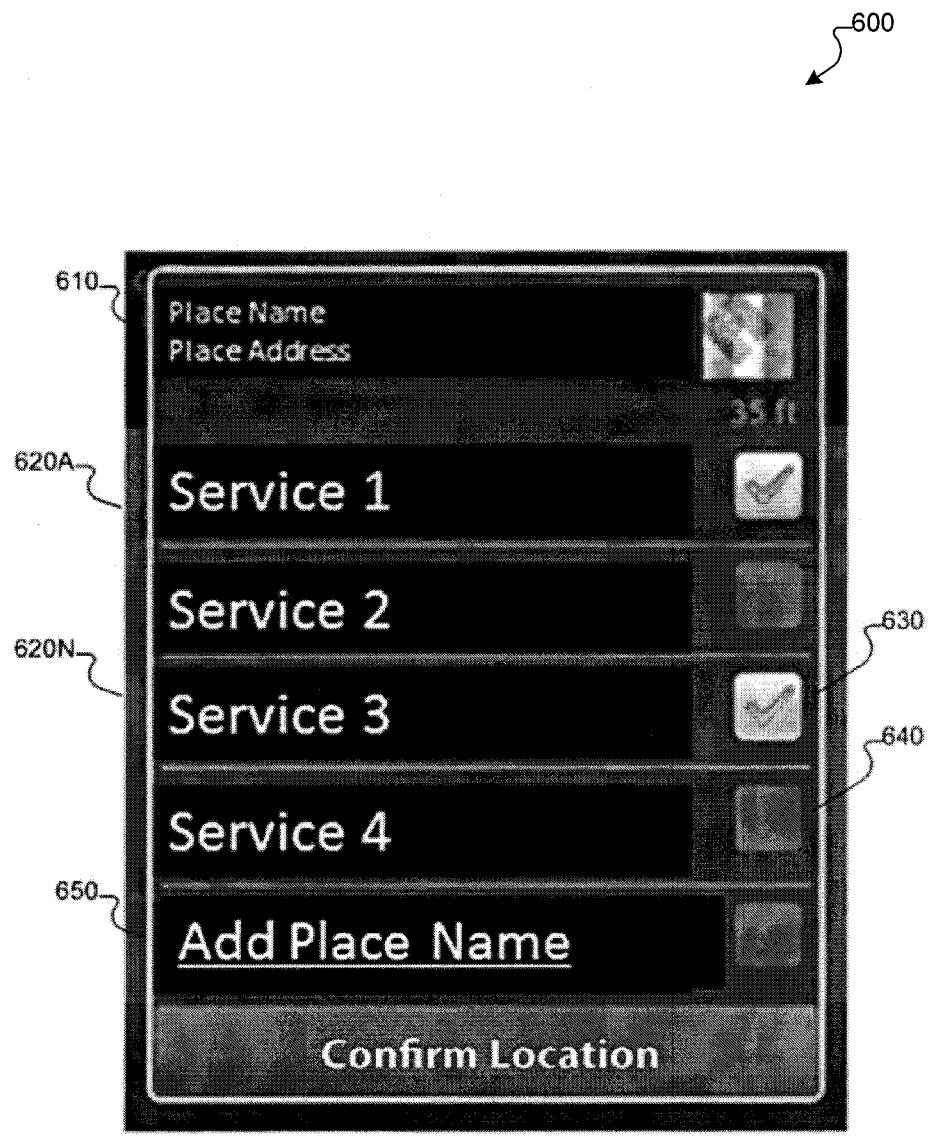
FIG. 6 depicts an example user interface.

FIG. 6 illustrates an example interface 600 that a user can use to check-in to a specific place. In this example interface, a user can choose the services (620A-N) that will register the user's check-in. Information 610 such as a place name, place address, and a corresponding location on a map is reflected on the interface. The user can select the specific service by toggling an indicator (630 and 640).

Place confirmation is not limited to manual confirmation. Measurements from sensors on the device, like sound, proximity, near field communication (NFC) chipsets can be utilized based on distinct characteristics for each place. As an example of a place confirmation can be obtained by utilizing the device to detect high frequency audio signals that encode the details of a place. A grocery store could be equipped with a device that generates audio signals that can be detected by sensors on a user's device. Place confirmations associated with these methods may be available to the inference pipeline as a form of reference data.

The data collection system facilitates easy means of allowing a user to confirm a visit to a place, and provides this data back to the server as reference data for the inference pipeline.

2.2.4.3 Offline Place Confirmation

Figure 7:
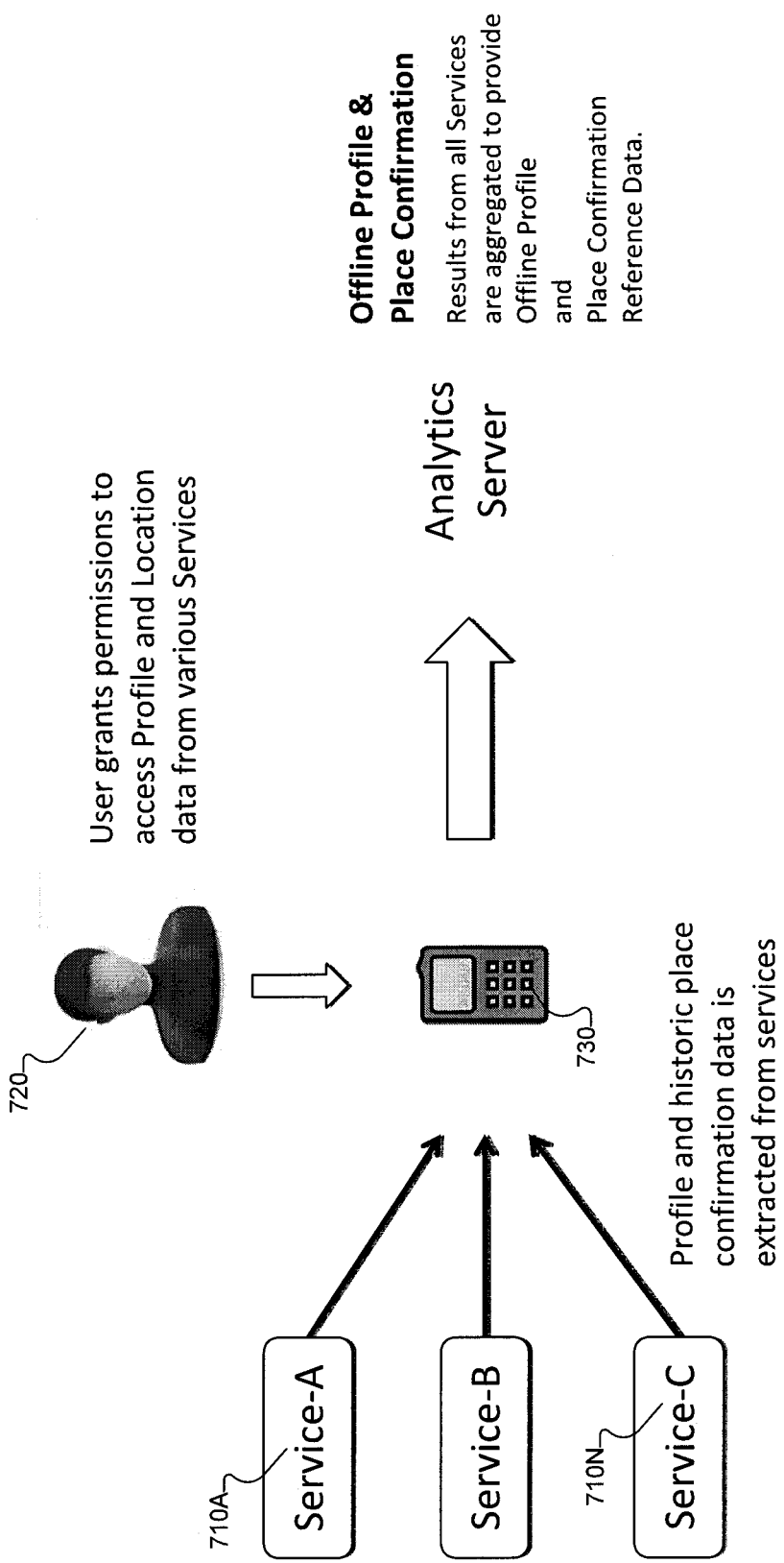
FIG. 7 depicts example user interactions with various services whereby offline profile and place confirmations can be collected.

FIG. 7 illustrates example user interactions with various services 710A-N whereby offline profile and place confirmations can be collected. As illustrated in FIG. 7, offline place confirmations occur when the analytics agent 730 is actively collecting data on a user 720, but does not directly receive a place confirmation. Offline place confirmations occur on another platform where a place confirmation has occurred. In other words, when the data collection system accesses place information provided by another service 710, the data collection system is accessing the place confirmation offline because it is granted access to user data not available within the analytics agent.

User data made available from services include user profile data, activities, demographics, behavioral markers, and Place Confirmations. Offline place confirmations are transferred to the data collection system via the analytics agent and married with the data collected in the analytics agent to generate reference data that is used in the inference pipeline.

2.2.4.4 Place Survey Answers

Figure 8:
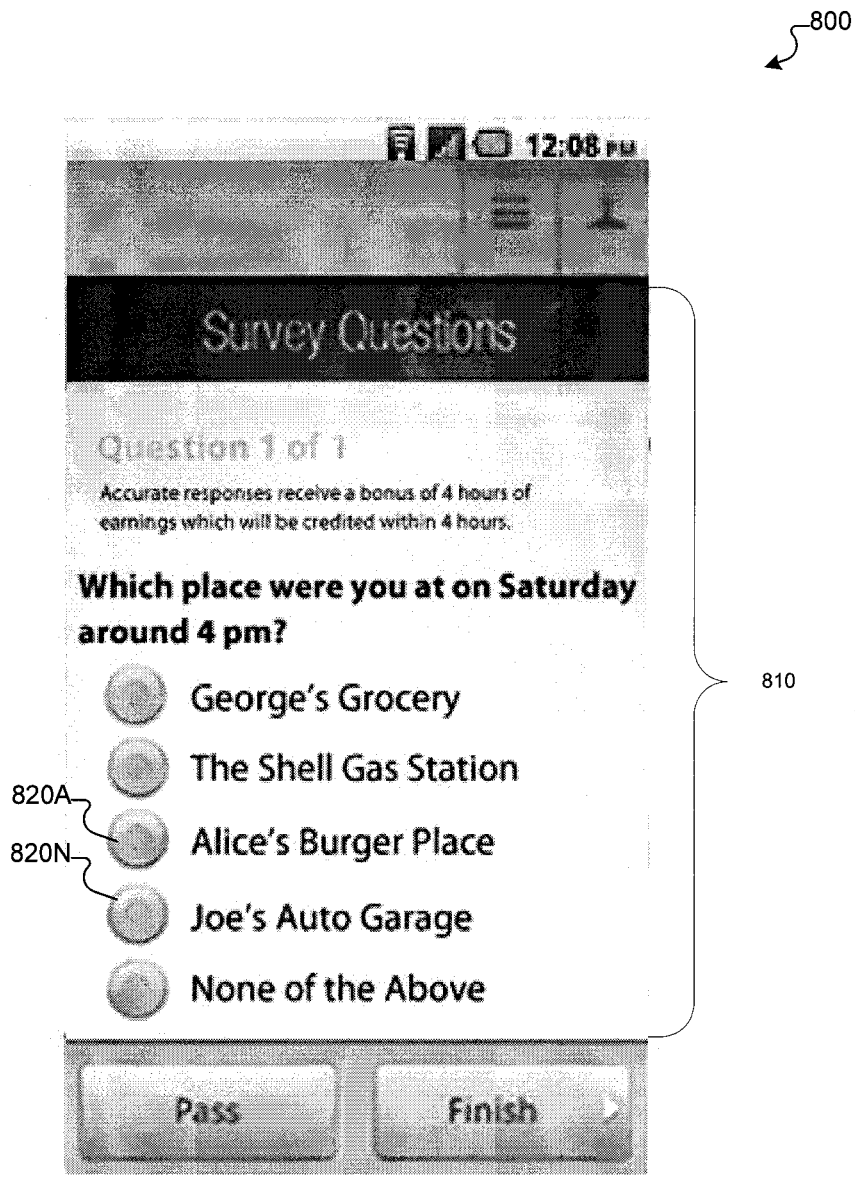
FIG. 8 depicts an example user interface displaying a place survey.

Place surveys are used to validate that a user is currently visiting, or has visited a place at a specific block of time. A place survey enables users to validate a location via a survey. Place surveys can take many formats including multiple choice, single affirmation, and open field response. FIG. 8 illustrates an example user interface 800 displaying a place survey 810. Place surveys can include known incorrect places 820A-N as options to identify users that provide false or bad data.

Place surveys are delivered digitally, typically via the device utilizing the analytics agent, with responses sent back digitally, typically via the device. Registered responses are treated as a form of reference data and utilized by an inference pipeline.

The data collection platform regularly prompts for survey questions based on various criteria which includes:

Restriction by time of day: Ensuring that a user is not prompted when asleep

Frequency cap: Ensuring a user is not overwhelmed by a large number of surveys

Figure 9:
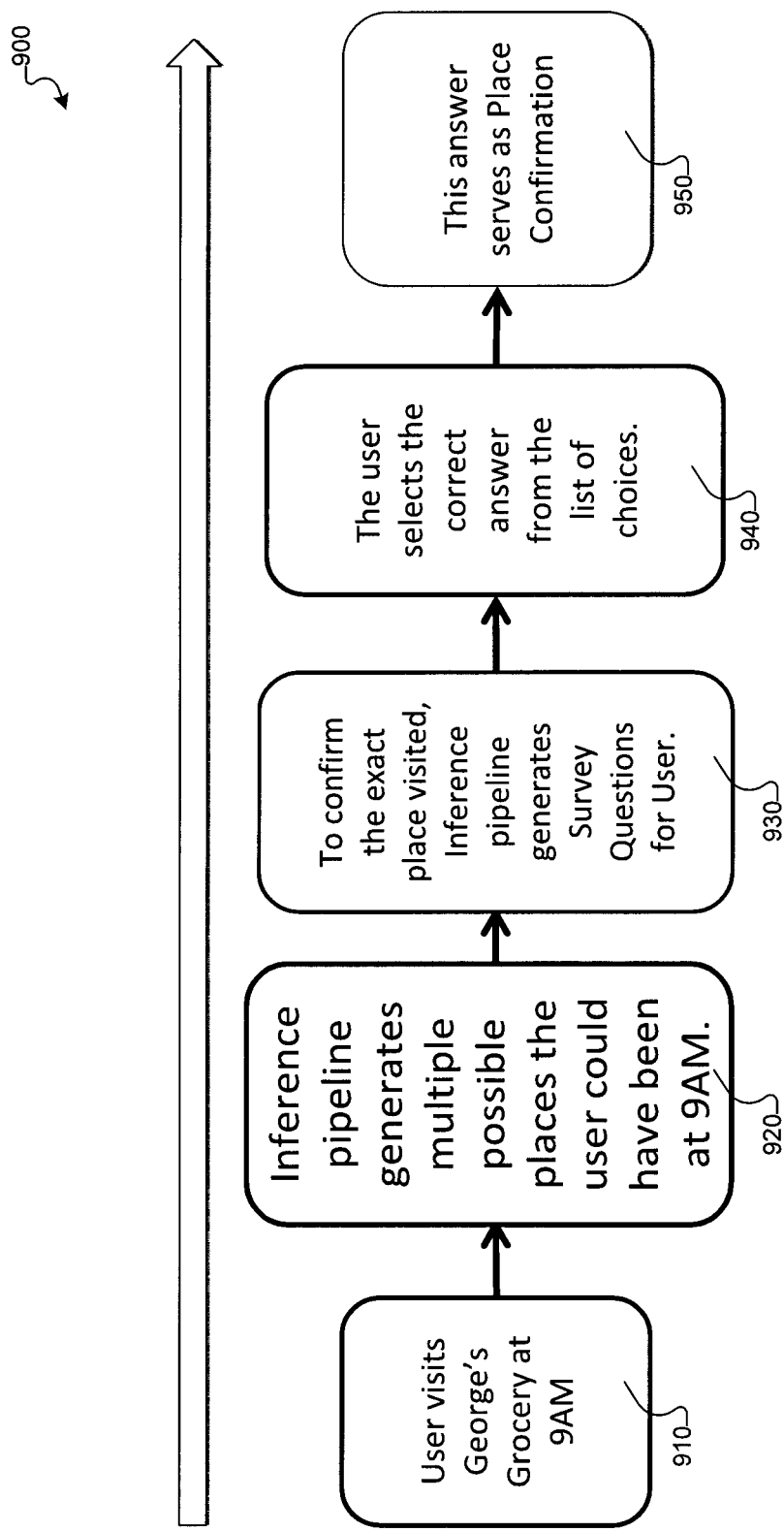
FIG. 9 depicts an example process by which places are generated in a place survey.

Targeted users: Selection of users that could be incentivized to provide more accurate data FIG. 9 shows an example process 900 by which places are generated in a place survey. As illustrated in FIG. 9, a user visits a place called George's Grocery at 9 AM at block 910. At block 920, the inference pipeline generates multiple possible places the user could have been at 9 AM. Subsequently, the inference pipeline generates survey questions for the user at block 930. The user then, at block 940, selects the correct answer from the list of choices and this answer serves as a place confirmation at block 950. Place confirmations act as a reference data source used in the inference pipeline. The places not selected also provide data used in the inference pipeline in that it if a known incorrect answer is selected, the inference pipeline discounts all responses, and the inference pipeline is able to tune itself by understanding which nearby places the user did not visit.

2.2.4.5 Census Reference Data

By combining a digital log with a mobile device, a user can be associated with a verified location in order to produce validated place data. The device registers observations that include location data, and the digital log enables an individual to log actual place and time data. Using time stamps, the place and time data of the digital log are combined with device observation data as a "join point." A join point can use time to correlate digital log data with device observation data. This joining of two sources of data generates reference data for the inference pipeline. For example, when a user enters information into a digital log that he was at a coffee shop at 9 AM, and when there is observation data collected at 9 AM, a join point is created for 9 AM that associates the device observations with a location of the user (i.e., coffee shop).

Reference data is considered highly accurate and generates quality-based entries for the digital log and is designed to generate pinpoint accuracy in terms of location, place, time, and activity.

TABLE 1

| Place Name | Mall/Area | Date | Walk-In Time | Leave Time | Entry/Exit | Path to Place | Actions at Place | Notes/Issues |
|---|---|---|---|---|---|---|---|---|
| General Store | Main St | Nov. 8, 2011 | 11:52 am | 12:01 pm | South Door | Took sidewalk from parking lot | Stood near entrance | NA |

Table 1 provides example fields in the digital log completed by a census. The values in these fields assign information to device observation data. The level of precision and accuracy is considered high based on the details collected by the digital logs. This census level data is considered high value across reference data sources.

2.3 Indirect Data Sources

Indirect data sources are acquired outside of the analytics agent. These indirect data sources provide markers including place, time, and location. These indirect data sources are acquired through various methods including imported data, crawled web content, third-party APIs, travel logs, photos, purchase data, calendars, call logs, geo-tagged content, and social networks. Social network activity and content data includes sharing of location information through status updates, geo-tagged content, including pictures and video, displayed or scheduled events, set preferences and associations, content interaction, profile information, and social network connections.

2.3.1 Third-party Sites 2.3.1.1 Geotagged Content

Any content with markers explicit or implicit qualifies as geotagged content. Explicit content is content that is tagged with a specific location in the form of address, latitude and longitude, or any other identifier of location. Implicit content is deriving signals from non-location specific data to infer a location.

Explicit content includes geo-tagged photos, events tracked digitally, social network activity, directions from one place to another, purchase data, rewards programs, membership cards, and online reservations. All explicit content has a location identifier that acts as a form of reference data to infer that user has visited a location. Examples of explicit content include a restaurant reservation made online which would include explicit location data with the address of the restaurant, and time of reservation.

Implicit content includes blog posts, social network activity, measurable activity across personal and professional connections, web content, and call logs. This type of content does not have a specific location, but can be inferred through data mining techniques. As an example, a person who visits a restaurant website, and then calls the restaurant, has a higher probably to be placed at restaurant than if this content was not available. As another example, when a user places an online food order for delivery or takeout, this information may also serve as implicit content through which location can be inferred.

2.3.1.2 Device Content and Activity:

Media and activity on the device can provide relevant information related to the location of a user. This may include calendar appointments, geo-tagged photos, phone calls and voicemails, reminders, texts, emails, email tags, internet search activity, etc.

The data collection system may extract address, place and time information from calendar appointments and associate it with measured location data from the analytics agent. Another example of device content is extracting time, lati- tude, and longitude from a geo-tagged photo and then using image recognition technology to identify or estimate a place to associated with device data.

Most modern devices equipped with a camera support the ability to associate the picture taken with the camera with metadata including date, time, and the location information (latitude, longitude, etc.) and the time at which the picture was taken.

In addition to the latitude and longitude, additional data can be garnered from the image, including accessing tags associated with the image. As an example, a photo on a social network might include tags that describe features of the place the image was taken (e.g., "Space Needle", "Visiting Seattle's Space Needle", "With Jill at the Space Needle"). Using image recognition technology, the place in the picture can be determined. This processing can occur on the device or by using a service to process the image and return a resulting place.

Using call logs, and voice and sound recognition, data can be converted to identify place information associated with the mobile device. Call logs can be mapped to a place, and tying in latitude and longitude act as a form of reference data. With voice and sound recognition, conversations can be mined for details on the current location, as well as past and future activities. An example conversation would be:

Receiver: This is Judy's Hair Salon.

Caller: This is Jill. I'd like to schedule a haircut with Sandy this Sunday at 7:30 pm.

Additionally by taking into account background sounds, it is possible to narrow down places a user may be. As an example, noise from a subway station including the sound of trains on rails, schedule announcements, and crowd noise can act as signals to identify a place.

Digital calendars typically include metadata that indicates time, date, location, and people to be at a certain location at a certain time. This information can be utilized to validate and expand reference data sets.

Using text searches, the inference pipeline can identify place and time associations on the mobile device. For example, if the user has an email that mentions his itinerary for a vacation, it is most likely going to have place and time information for the period of the vacation. This information identifies or estimates the place of the user and can be associated with device data at that time.

Device activity, such as battery status, can provide indicators of location. For example, when a metric of battery life increases, this is indicative of a charging device whereby a user may be limited to select locations. This data is used in the inference pipeline to further refine the list of places a user maybe at a given point in time.

2.3.1.3 In-Store Activity

Users store activity sourced from credit card activity, coupon redemptions, credit reports, membership cards, and reward or loyalty programs are an additional source of data that provide insight to the places visited by a user at a given instance of time. Store activity incrementally provides details around a purchase including items, and price.

Store activity married with location data act as a form of automated place confirmation. The act of a purchase identifies a place where purchase occurred, and a time when the purchase occurred. These values joined with location data act as a form of place confirmation and is treated as reference data for an inference pipeline.

Without the location data, store activity is still used in an inference pipeline as identifying the user has visited place attributed by purchase, and the frequency of purchases determines frequency of visits. This store activity can serve as a behavioral roadmap of past activity and can be indicative of future behavior in the form of places visited.

This data could be collected in real time or offline via bulk imports and made available for the inference pipeline.

2.3.1.4 Network Data

Network data includes a network of devices that registers location data at various levels of precision. Sources of network data include mobile carriers, network service providers, device service providers and the data and metadata may be collected as a byproduct of core services.

As an example a mobile carrier provides cell phone service to millions of customers via their cellular network. This network as a byproduct of providing core cell service registers location data because the mobile device is connected to an access point. Aggregating this data across all customers creates a density map of carrier activity associated with location, which the data collection system defines at Network Data. This network data can act as a proxy of baseline location activity for millions of customers. In addition, the network data may help to identify popular sites or more trafficked areas so that more accurate predictions for a user's location can be made.

The network data acting as baseline location activity enables the data collection system to identify location biases and build models to normalize against those biases. As more sources of network data are incorporated, the models become more robust and diversified as a single source may not accurately represent a population in a given geographic area.

3. THE CLIENT

In order to collect data in a consistent manner from devices, the data collection system includes an analytics agent that is architected to collect location relevant data from a device and store this data anywhere making it available for the inference pipeline.

3.1 The Analytics Agent

The analytics agent provides a simple interface that easily integrates with user devices. It exposes simple public interfaces that can be used to collect profile and observation data. The analytics agent has device-specific means of collecting device data including location and sensor data from the device. The API is architected for easy set up and integration with devices.

Figure 10:
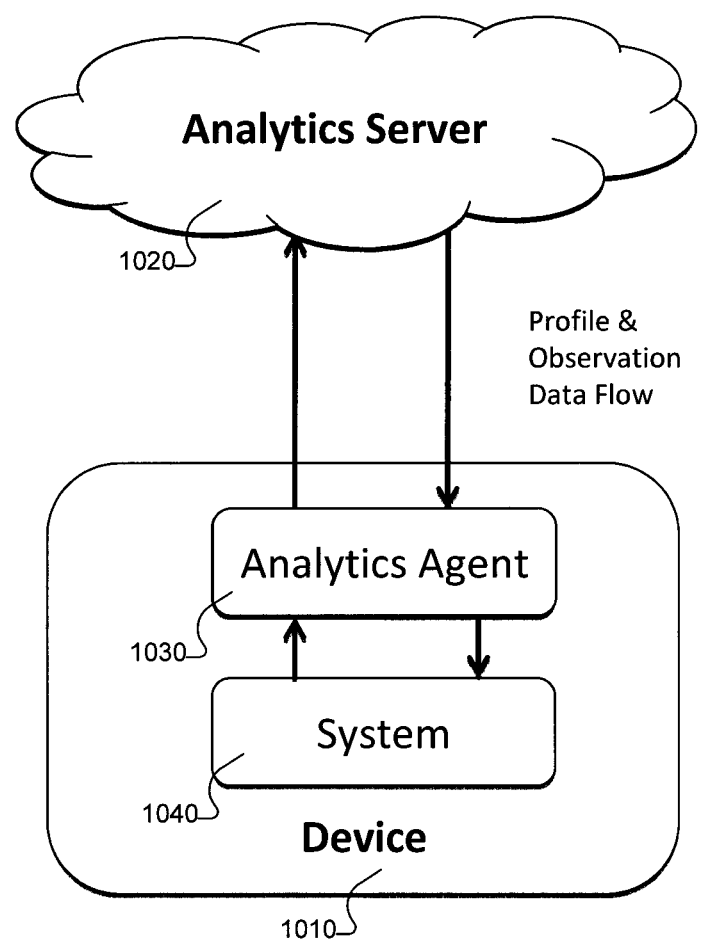
FIG. 10 depicts a high-level architecture of an analytics agent assisting data flow between a device system and a device storage.
Figure 11:
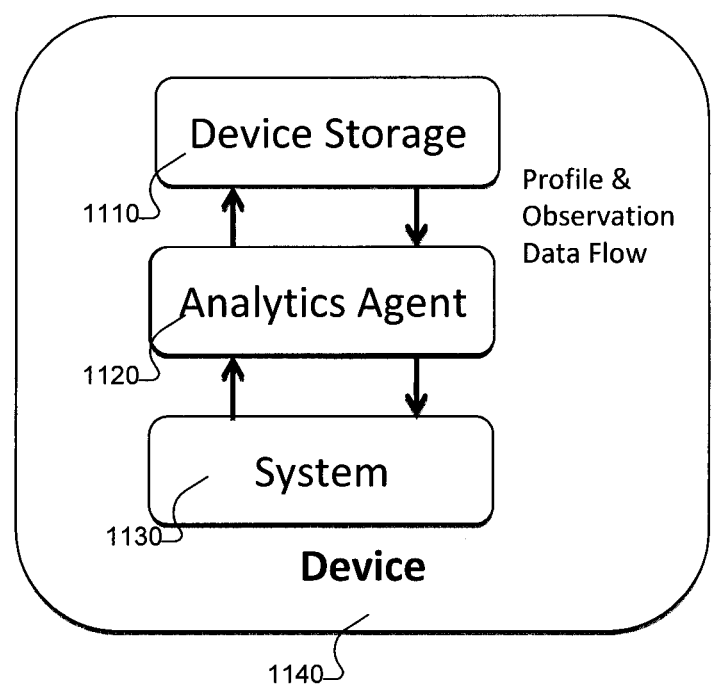
FIG. 11 depicts a high-level architecture of an analytics agent assisting data flow between a device and an analytics server.

FIG. 10 illustrates a high-level architecture of an analytics agent 1030 assisting data flow between a device storage (not shown) on an analytics server 1020 and user system 1010 and analytics agent 1030 on a device 1010. FIG. 11 illustrates a high-level architecture of an analytics agent 1120 assisting data flow between a user system 1130 and a device storage 1110 on the device 1140. In FIGS. 10 and 11, the analytics agent receives/collects data from the device that may be stored on the device storage or may be transmitted back to the analytics server. The analytics agent also provides a feedback mechanism by which data collection in the device can be tuned.

3.1.1 Location/Sensor Data Collection

The analytics agent has a background activity that collects observation data at intervals of time that are determined by algorithms that are optimized to gather as many data points required for the inference pipeline with the least impact on the device resources. This data collection activity runs as a background thread on the device and does not block the normal functioning of the device.

3.1.2 Data Storage on the Device

The analytics agent may provide abstractions over the device data storage to store data on the device if necessary. The device data can be made available to the inference pipeline on the client. The device data may also be transmitted to the analytics server in raw form, batched, compressed, or by various other means of data transmission.

3.1.3 Data Transmission

The analytics agent may provide abstractions over the device data transmission protocols to send/receive data to the analytics servers.

Data transmission may be batched to improve efficiency of data transfer. To avoid single large data transmission, the maximum size of data may be capped per sync batch. The analytics agent may include transmission failure handling that mitigates data Sync failures due to various reasons such as the network is unavailable, client errors, server error, etc. If the data transmission fails, the agent may choose to retry the transmission an acceptable number of times, after which the data may be deemed corrupt and marked for purge. Purging of data may be necessary to ensure efficient usage of the device storage.

3.2 Third-Parties

Figure 12:
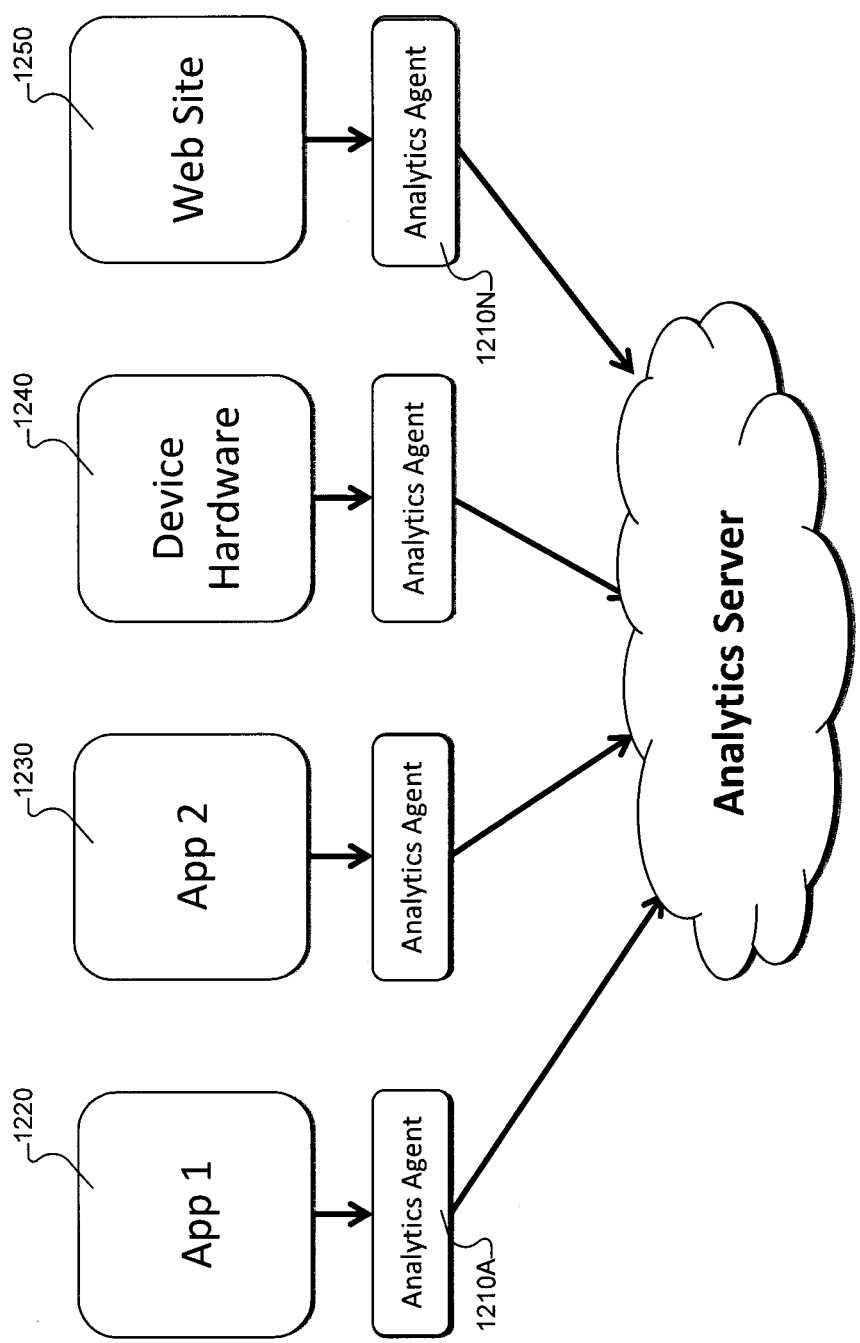
FIG. 12 depicts example systems and applications that can integrate the analytics agent of the data collection system.

FIG. 12 illustrates example systems and applications (e.g., 1220-1250) that can integrate the analytics agent (1210A-N) of the data collection system. As shown in FIG. 12, the independent and generalized mechanism of data collection in the analytics agent enables third-parties to easily integrate the analytics agent in their devices. The analytics agent provides the third-party an API library in exchange for location-based analytics from a device.

This approach enables the data collection system to exponentially scale the rate of data collection as more and more individuals utilize the analytics agent.

An example of this scenario could be a mobile application that allows customers to scan the barcode of consumer products in a shop to obtain more product information, and to even purchase the product. The developer of this application may choose to integrate the application with the analytics agent API to tag barcode scans with location and other sensor-related data. In turn, the data collection system can collect location-related data from third-party applications, thus exponentially scaling the rate of a data collection.

4. DATA COLLECTION IMPLEMENTATIONS

4.1 Standalone Client Implementation

One form of the data collection system has the inference pipeline running on the device. In this scenario the inference pipeline accesses this data directly on the device and runs the inference modeling on the device to generate the feedback that may be used by the data collection system. This process enables the entire cycle from data collection to inference modeling, as well as a feedback loop to be encapsulated on the device.

4.2 Client and Server Implementation

Client and server implementation is when the data collection system the analytics agent transmits data from the device to the analytics server. This allows for inference and data aggregation to be done on the server and feedback to be transmitted back to the device via the analytics server.

This also allows for hybrid approaches where inference and feedback occurs both on the client and server.

5. THE ANALYTICS SERVER

5.1 Representative Environment of the Analytics Server

The analytics server receives incoming data collected from the devices. The server may also push data to the devices creating a feedback loop that drives efficient data collection.

Figure 13:
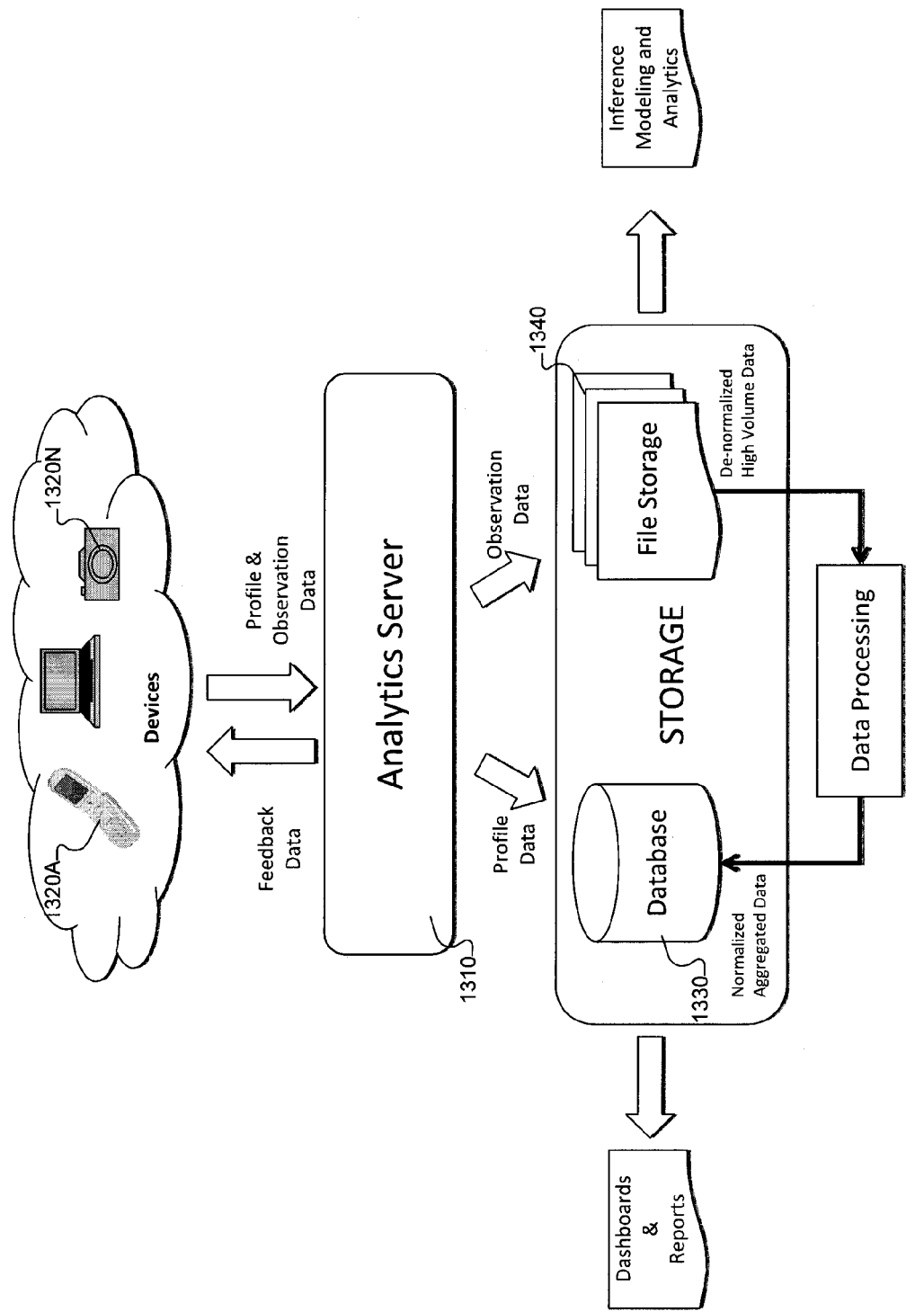
FIG. 13 depicts a high-level layout of backend components and data flow.

FIG. 13 shows a high-level layout of the backend components and data flow. Devices 1320A-N may transmit data that is received by the analytics server 1310. Profile data is stored in relational databases 1330 while the large volume Observation data is stored in distributed file storage 1340. Data processing jobs are used to normalize the large volume data in a distributed files storage, which is then merged with profile data and made available for reports and dashboards. The raw observations are made available for the inference pipeline.

5.1.1 Storage of Profile Data

Profile data typically scales linearly as the number of users and devices increases. This data is usually accessed frequently. Hence the server directs this data to be stored in relational databases.

5.1.2 Storage of Observation Data

Observation data grows exponentially as the number of users and devices increases. This data is typically processed by offline processing jobs that de-normalize the data for easier access. The server directs this data to be stored in distributed file storage.

5.2 Data Segmentation

The data collected from the devices are stored with the following segmentations

5.2.1 Segmentation of Data by Device and User

Observation data has a reference to the user and device that made the observation. This allows for efficient storage and retrieval of data.

Figure 14:
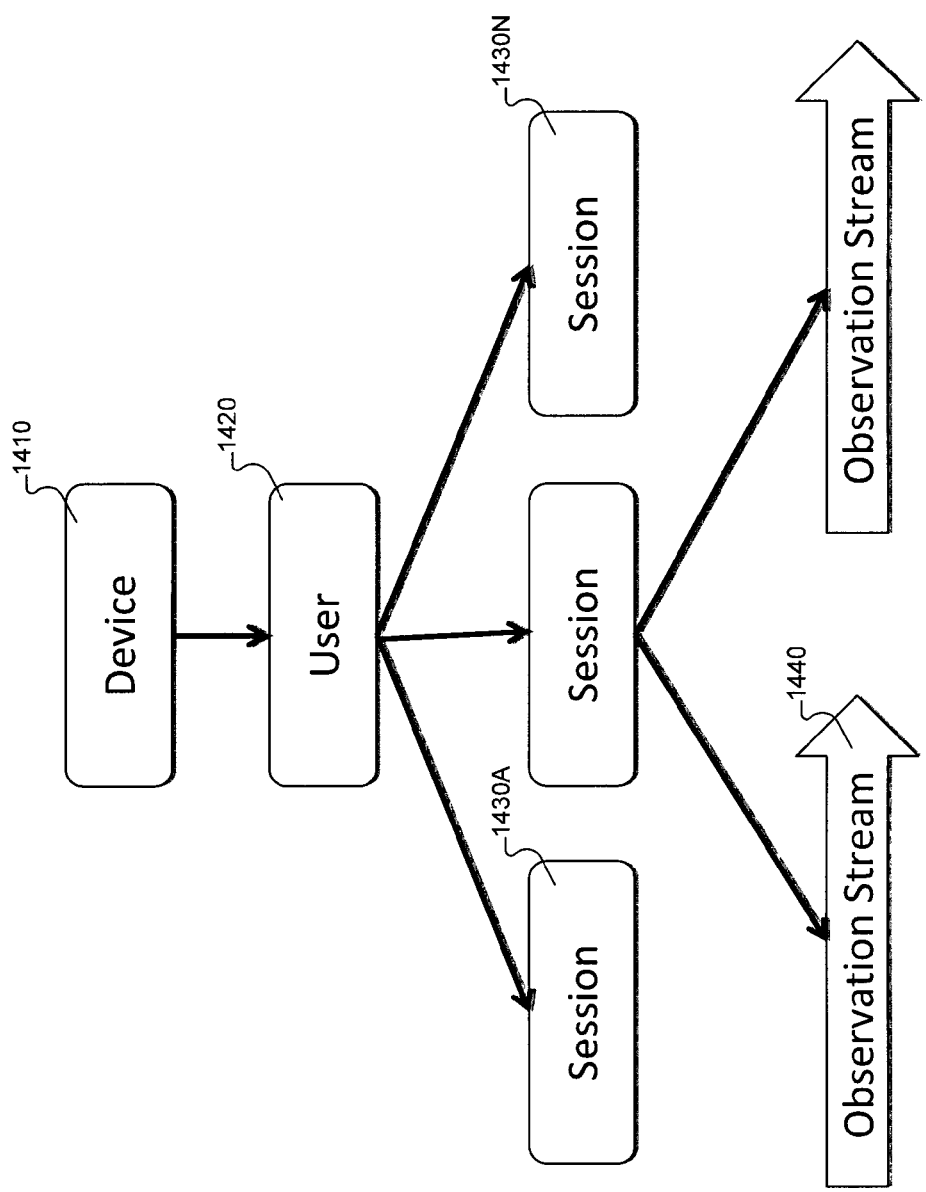
FIG. 14 depicts a high-level segmentation of observation data by device, user, and session.

FIG. 14 illustrates a high-level segmentation of observation data by device 1410, user 1420, and session(s) 1430A-N. As shown in FIG. 14, a user 1420 is associated with a device 1410. Each user, when active can create multiple user sessions 1430A-N. Each session represents a window of time the application was in use and in which observations 1440 are clustered. While the user is in a session, all observations that occur are associated with this session.

This provides the ability to track for example, multiple users using a single device. In another instance, a single user who has reinstalled the application multiple times can be tracked, wherein each installation signifies a new session.

5.2.2 Panels

A panel is an abstraction of a business grouping. Abstraction called panels are used to associate users with specific business groupings. Users may be invited to join panels based on the business goals of the panel. Inference and analytics may leverage this panel abstraction to correlate and/or aggregate results against a panel.

5.2.3 Panelists

A panelist represents the association of a user's association with a panel. Abstractions called panelists are used to identify a user who is associated with a specific panel. Users are invited to join a panel. They may choose to join the panel to become panelists. Location related data may be segmented by panelists.

5.2.4 Usage

Usage refers to the abstraction of the availability of observation data for a user. Usage is associated with the availability of observation data. This usage may be segmented by panelist thereby identifying the activity of a user in the context of a panel.

5.2.5 Usage Redemption

When a panelist utilizes a device that is enabled with the data collection system, they may accrue usage. This usage may be redeemed for rewards that may be distributed by the panel owner.

5.2.6 Custom Questions

Survey questions may be pushed to panelists within the context of a panel segmentation. Questions are segmented by panel and can be targeted to specific panelists if necessary.

5.3 Data Storage

5.3.1 Profile Data

The profile data received from devices are stored in a relational database. This data is used to drive the device, web dashboards and internal/external reports. This data is also used by the inference pipeline and provides the analytics when mapping observations to user, device and demographics, etc.

5.3.2 Observation Data

Figure 15:
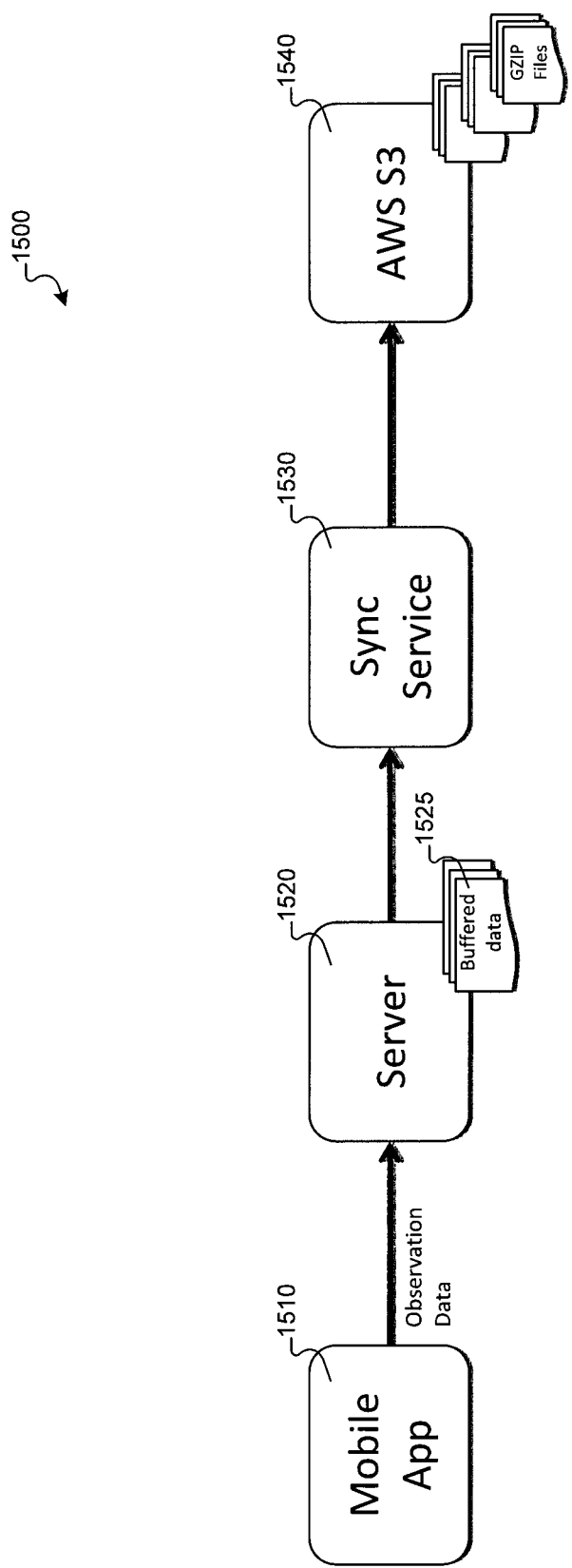
FIG. 15 depicts an example process by which the analytics server receives observation data from a device.

FIG. 15 illustrates an example process 1500 by which the analytics server 1520 receives observation data from a device 1510. It is buffered 1525 on each server node 1520 and periodically uploaded to the storage 1540 by a sync service 1530.

5.3.3 Normalization of Observation Data

In order to report and act upon the large volume of de-normalized observation data in storage, the observation data is normalized. The first stage is to sort and group observations by user, device and/or timestamp. The next stage is to iterate through the grouped data and compute aggregated metrics like session and location counts per user, activity per user on an hourly basis, etc. The normalized data is then stored in a relational database and available to the front end application and reports. In one implementation, reports include predicted place visits. Predicted place visits are a set of places that user may have visited at an instance of time. Each visited place is associated with a probability that the person was at that place.

5.3.4 Denormalized Observation Data

The denormalized observations collected from the device are made available for the inference pipeline to process for inference and analytics.

6. THE FEEDBACK LOOP

Figure 16:
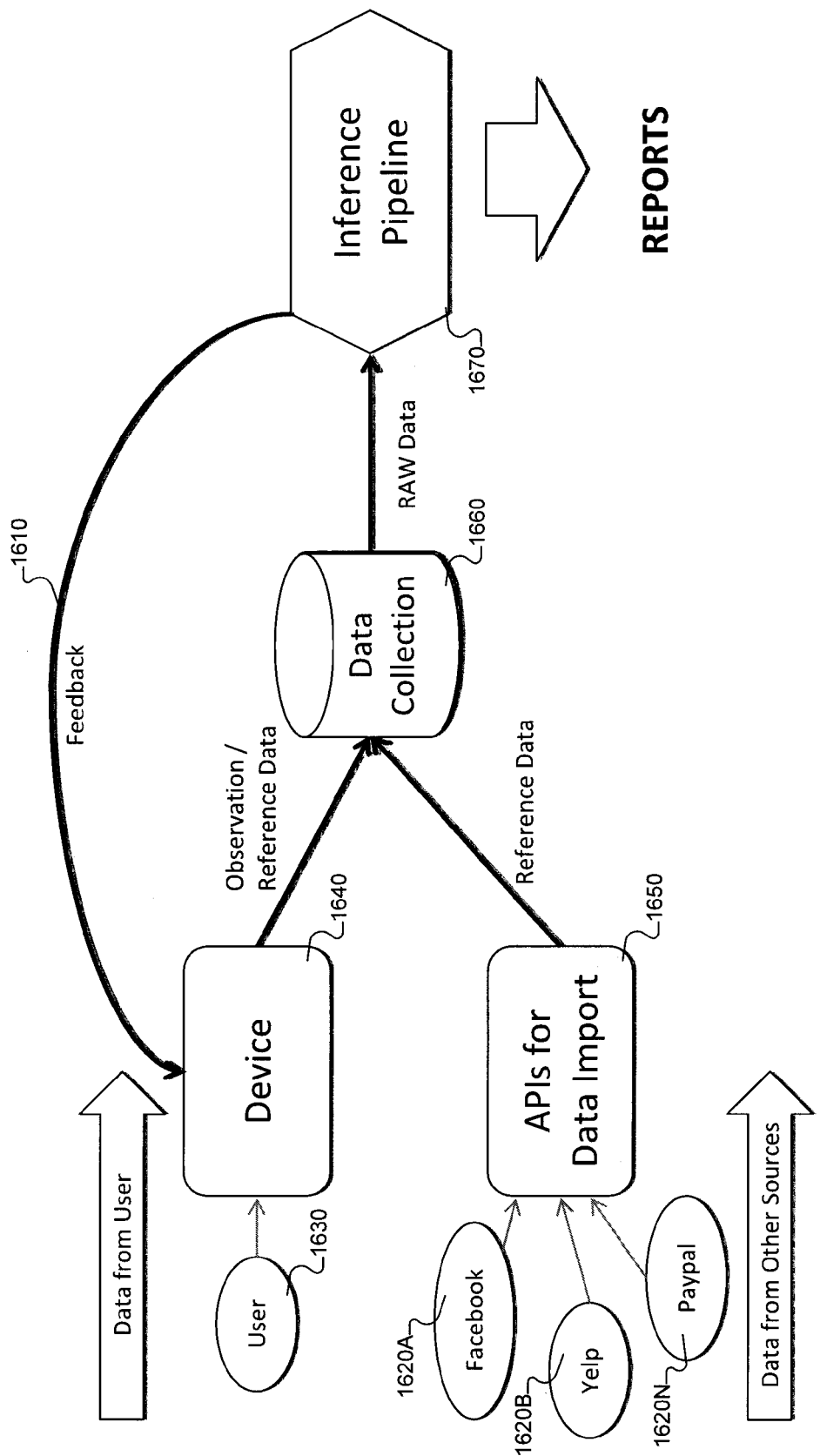
FIG. 16 depicts a suitable process and environment in which implementations of the data collection system can operate.

FIG. 16 illustrates a process and environment in which implementations of the data collection system can operate.

As shown in FIG. 16, a feedback loop 1610 in the data collection system which allows characteristics of observation data to tune the data collection strategy for higher accuracy and efficient usage of device resources. As discussed above, observation and reference data can originate from an electronic device 1640 of a user 1630 or from services 1620A-N via data import 1650. The data collection system 1660 receives and processes the observation and reference data and forwards the necessary information (e.g., raw data) to the inference pipeline 1670 for further analysis.

7. USER INTERFACE

Figure 17:
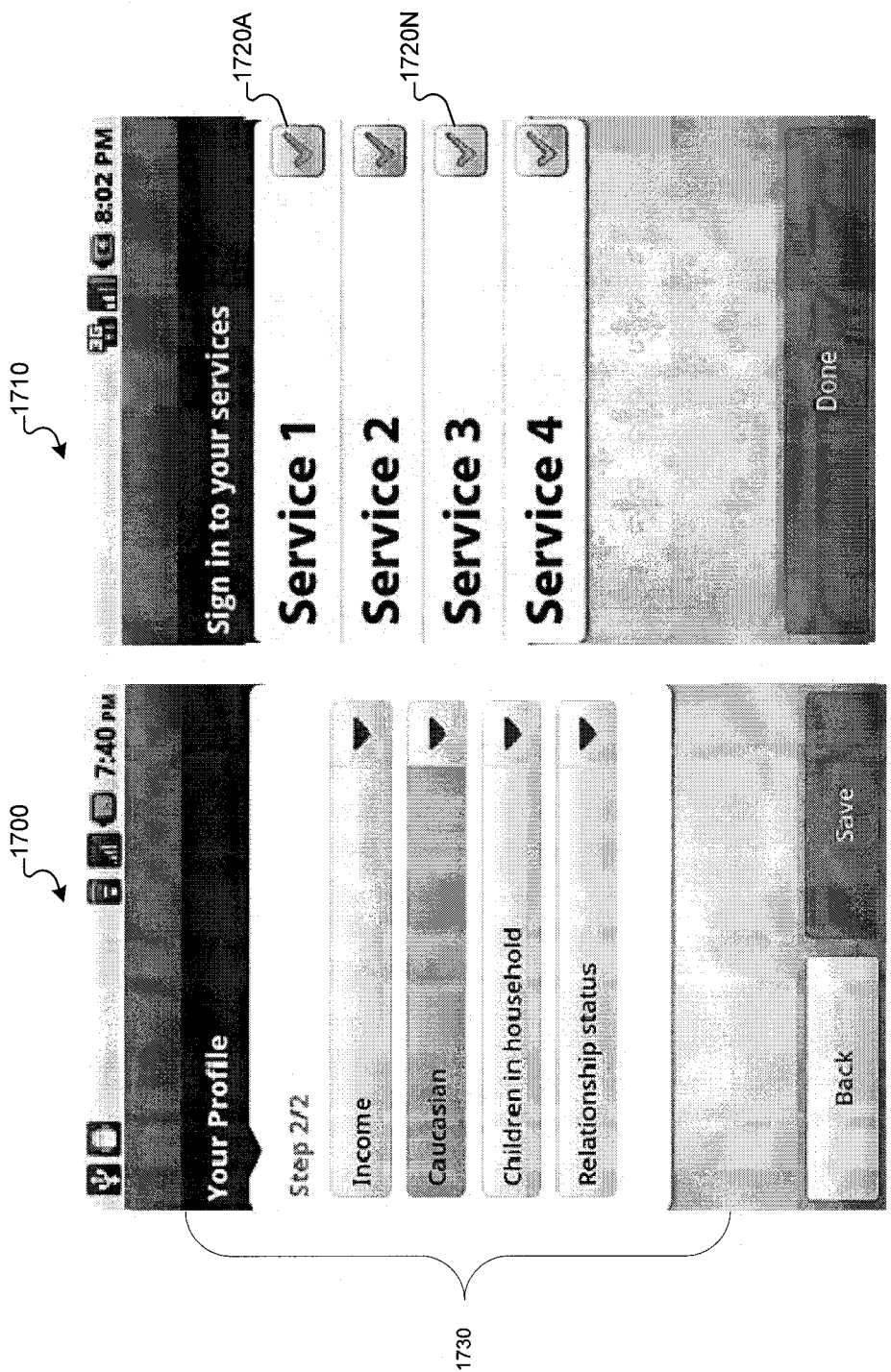

FIG. 17 depicts example user interfaces (1700 and 1710) whereby a user may configure a profile and service(s) to register a check-in. FIG. 17 illustrates an example user interface 1700 whereby a user may enter various personal characteristics 1730 to establish a profile in the data collection system. FIG. 17 illustrates another example user interface 1710 whereby a user may configure the services which may register a check-in. In one implementation of interface 1710, a user may toggle certain indicators (1720A-N) to select the default services that will register a check-in upon signing-in to the data collection system. In another implementation, a user may toggle the indicators to reflect the services in which a user has an account. Those skilled in the relevant art will appreciate that the user interfaces (1700 and 1710) may be configured in a variety of ways.

8. THE INFERENCE PIPELINE

The inference pipeline takes as input a user's data collected by a mobile electronic device, recognizes when, where and for how long the user makes stops, generates possible places visited, and predicts the likelihood of the user visiting those places. The function of this pipeline is, given a user's information collected by a mobile electronic device, recognize whether a user visited a place, and if so, what is the probability the user is at a place, and how much time the user spent at the place. It also produces user location profiles which include information about users' familiar routes and places.

8.1 Data Input

The input to the inference pipeline is a sequence of location readings and sensor readings the mobile electronic device logged. There are three sources of locations: GPS, Wi-Fi and cell tower, and multiple types of sensors. Each location reading includes time stamp, location source, latitude, longitude, altitude, accuracy estimation, bearing and speed. Each sensor reading includes time stamp, type of sensor, and values.

The data collection system provides the data required for the inference pipeline.

8.2 Generating Models to tune Data Collection

Various models in an inference pipeline can be used to tune the data collection strategy. Tuning helps maximize the quantity and quality of the data collected while minimizing the impact on the device resources like battery, processor, location data accuracy, etc.

The models in the inference pipeline instruct the data collection to increase the rate of data collection when higher data fidelity is required, and reduce the rate of data collection when data fidelity is not significant.

Another implementation of an Inference algorithm to improve the data accuracy is to apply a high rate of data collection when the device or application is turned on/awoken. Over time, the rate of data collection may decrease so as to maintain a high fidelity of data collection in the initial phase of a session of device usage. For example, the rate of data collection may initially be every tenth of a second for the first four minutes after the device is turned on; and then reduced to twice a minute thereafter.

Examples of how feedback from the inference pipeline is used to tune the rate of data collection includes:
1. Reducing data collection rate when a user is at home or at work
2. Reducing data collection rate when a location/area is not as accessible by GPS (e.g., downtown area)
3. Reducing data collection rate when a user is commuting (as detected by time or observation data)
4. Adjusting data collection rate in accordance to a user's schedule
5. Adjusting data collection rate in accordance to a user's history of visits (e.g., if a user does not typically go out for lunch, data collection rate is reduced at lunch time)

8.2.1 Improved Device Resource Utilization

In one implementation, inference generates a model that indicates when the user is at a location where in tracking location is not significant. An example of this model is the home/work model.

Home/work is incorporated to the data collection device. When a user is detected to be around home location or work location, a higher interval is used in data collection, to conserve device's resources, for example, battery and data transmission.

In another implementation, Inference models running on the device can detect user activity and situations that serve as indicators to increase or decrease the rate of data collection. Examples of these include:
1. Using device orientation and acceleration to determine the usage scenario of the device.
   a. Inclined and fast moving for a sustained period of time could imply driving
   b. Bouncing pattern could imply walking or running
2. Using in audible high frequency audio to detect the visit to a place
3. Using Bluetooth to detect the presence of a device in a place
4. Using temperature and light to detect probable location of the device
5. Using audio sensors to detect characteristic sounds like bus, airplane, music concerts, railway station, ocean, wind, climate (thunder, rain), mood (crowded market versus peaceful vacation), etc. to tune data collection strategy and provide valuable indicators to an inference pipeline

9. CONCLUSION

Reference throughout this specification to features, advantages, or similar language does not imply that all of the features and advantages that may be realized with the present invention should be or are in any single implementation of the invention. Rather, language referring to the features and advantages is understood to mean that a specific feature, advantage, or characteristic described in connection with an implementation is included in at least one implementation of the present invention. Thus, discussion of the features and advantages, and similar language, throughout this specification may, but do not necessarily, refer to the same implementation.

Furthermore, the described features, advantages, and characteristics of the invention may be combined in any suitable manner in one or more implementations. One skilled in the relevant art will recognize that the invention can be practiced without one or more of the specific features or advantages of a particular implementation. In other instances, additional features and advantages may be recognized in certain implementations that may not be present in all implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. An apparatus for providing geolocation data, the apparatus coupled to receive data from multiple mobile devices wirelessly coupled to a network, the apparatus comprising:
   at least one data storage device for storing geolocation data received from the multiple mobile devices,
      wherein the geolocation data includes place data and corresponding latitude and longitude coordinate data, and
      wherein at least some of the place data includes names of buildings located at corresponding latitude and longitude coordinates;
   at least one server computer coupled to the data storage device, wherein the server computer is configured to receive observation data from the multiple mobile devices and to
   infer place names for locations of the multiple mobile devices based on the received observation data;
   provide sets of questions to individual users of the multiple mobile devices,
      wherein each set of questions includes a request for a user response and includes multiple inferred place names that may correspond to a latitude and longitude location where one of the mobile devices is or was located;
   receive, from individual users of the multiple mobile devices, place name responses to the sets of questions, wherein each response includes a selection of one of the multiple place names for the location where the one mobile device is or was located;

store, in the data storage device, the received place name responses from the individual users in response to the sets of questions, wherein the received place name responses are associated in the data storage device with corresponding latitude and longitude coordinate data, and wherein the received place name responses are utilized in improving accuracy with which place names for locations of the multiple mobile devices are inferred.

2. The apparatus of claim 1,
wherein the observation data includes
device data identifying an individual mobile device;
timestamp data associated with the received observation data;
location data for the individual mobile device, wherein the location data includes at least three of: latitude, longitude, altitude, accuracy of measurement, bearing, or speed of the mobile device; and
sensor data from sensors of the individual mobile device, wherein the sensor data includes at least one of: acceleration, magnetic orientation, proximity, light intensity, battery status, gyroscope or temperature;
infer place names for locations of the multiple mobile devices based on the received observation data, wherein at least some of the inferred place names are rank ordered based on an inferred probability; and,
provide in each of set of questions the multiple place names in a predetermined order.

3. The apparatus of claim 1,
wherein the observation data includes at least two of
device data identifying an individual mobile device;
timestamp data associated with the received observation data;
location data for the individual mobile device; or
sensor data from sensors of the individual mobile device.

4. The apparatus of claim 1, wherein the server computer is further configured to provide compensation to at least some users who provide responses to the provided sets of questions.

5. The apparatus of claim 2, wherein the predetermined order includes ordering the multiple place names based on an estimated accuracy.

6. The apparatus of claim 2, wherein the predetermined order includes ordering the multiple place names based on a frequency of past visits.

7. A non-transitory computer readable storage medium storing instructions for collecting data that validates a geolocation of a user of a mobile device, the computer readable storage medium comprising:
instructions for storing geolocation data received from the mobile device, wherein the geolocation data includes latitude and longitude coordinate data;
instructions for prompting the user of the mobile device for a place confirmation,
wherein the place confirmation includes a place name selected from a list of possible place names that may correspond to a latitude and longitude location where the mobile device is or was located, and
wherein the place name includes a name of a venue located at corresponding latitude and longitude coordinates;
instructions for storing, in a database, the place confirmation,
wherein the received place confirmation is associated in the database with corresponding latitude and longitude coordinate data;
instructions for collecting sensor data from sensors of the mobile device to validate the associated latitude and the associated longitude coordinate data,
wherein the sensor data includes at least one of: acceleration, magnetic orientation, microphone, proximity, image sensor, ambient light sensor, battery status, gyroscope, or temperature; and
instructions for providing a feedback to the mobile device based on characteristics of the sensor data to adjust collection of the sensor data and the geolocation data.

8. The computer readable storage medium of claim 7, further comprising instructions for extracting device activity data to validate the associated latitude and the associated longitude coordinate data from one of: a geo-tagged image, a user profile, email, calendar appointment, call log, or SMS activity.

9. The computer readable storage medium of claim 7, further comprising instructions for extracting purchase data to validate the associated latitude and the associate longitude coordinate data, wherein purchase data includes at least one of: bar code scans, credit card activity, or club membership activity.

10. The computer readable storage medium of claim 7, further comprising instructions for extracting social networking activity and content data to validate the associated latitude and the associated longitude coordinate data.

11. The computer readable storage medium of claim 7, further comprising instructions for utilizing digital log data to validate the associated latitude and the associate longitude coordinate data, wherein the digital log data includes place, date, and time information.

12. An apparatus for providing geolocation data to a server, comprising:
at least one memory;
at least one radio;
input/output components;
at least one processor coupled to the memory, radio and input/output components, wherein the apparatus is configured to:
transmit geolocation data to the server, wherein the geolocation data includes latitude and longitude coordinate data;
receive from the server a set of questions,
wherein the set of questions includes a request for a user to respond and includes multiple place names that may correspond to a latitude and longitude location where the apparatus is or was located,
wherein included among the multiple place names in the set of questions is a place name that is an incorrect choice; and
wherein at least some of the place names includes names of buildings located at corresponding latitude and longitude coordinates; and
transmit a selection of one of the place names to the server in response to the set of questions,
wherein the response includes a selection of one of the multiple place names for the location where the apparatus is or was located; and
wherein when the response corresponds to the place name that is an incorrect choice, the response is disregarded; and wherein when the response corresponds to a place name other than the place name that is an incorrect choice, the response is stored in the data storage device in association with the latitude and longitude location where the apparatus is or was located.

13. The apparatus of claim 12, further configured to:
transmit observation data, wherein the observation data includes at least two of
device data identifying the apparatus;
timestamp data associated with received observation data;
location data for the apparatus; or
sensor data from sensors of the apparatus.

14. The apparatus of claim 12, further configured to receive an indication of compensation in response to providing to the server a response to the provided set of questions.

15. A method for receiving data from multiple mobile devices wirelessly coupled to a network, comprising:
storing, in a data storage device, geolocation data received from multiple mobile devices, wherein the geolocation data includes place data and corresponding latitude and longitude coordinate data;
receiving observation data from the multiple mobile devices;
generating, based on an analysis of the observation data, possible place names for locations of the multiple mobile devices;
providing sets of questions to individual users of the multiple mobile devices,
wherein each set of questions includes a request for a user response and includes multiple possible place names corresponding to a latitude and longitude location where one of the multiple mobile devices is or was located;
receiving, from individual users of the multiple mobile devices, place name responses to the sets of questions,
wherein each response includes a selection of one of the multiple possible place names for the location where the one mobile device is or was located;
storing, in the data storage device, the received place name responses from the individual users in response to the sets of questions in association with corresponding latitude and longitude coordinate data; and
utilizing the place names responses to improve accuracy with which possible place names for locations of the multiple mobile devices are generated.

16. The method of claim 15, wherein at least some of the place data includes names of buildings located at corresponding latitude and longitude coordinates.

17. The method of claim 15,
wherein at least some of the possible place names are rank ordered based on an inferred probability; and,
providing in each of set of questions the multiple place names in a predetermined order.

18. The method of claim 17, wherein the observation data includes:
device data identifying an individual mobile device;
timestamp data associated with the received observation data;
location data for the individual mobile device; and
sensor data from sensors of the individual mobile device.

19. The method of claim 18, wherein the location data includes at least three of: latitude, longitude, altitude, accuracy of measurement, bearing, or speed of the mobile device.

20. The method of claim 18, wherein the sensor data includes at least one of: acceleration, magnetic orientation, proximity, light intensity, battery status, gyroscope or temperature.

21. The method of claim 17,
wherein the observation
data includes at least two of
device data identifying an individual mobile device;
timestamp data associated with the received observation data;
location data for the individual mobile device; or
sensor data from sensors of the individual mobile device.

22. The method of claim 15, further comprising:
providing compensation to at least some users who provide responses to the provided sets of questions.

23. The method of claim 17, wherein the predetermined order includes ordering the multiple place names based on an estimated accuracy.

24. The method of claim 17, wherein the predetermined order includes ordering the multiple place names based on a frequency of past visits.

25. The method of claim 15, further comprising:
including a place name that is an incorrect choice among the multiple place names included in at least one of the sets of questions.

26. A system for receiving data from multiple mobile devices wirelessly coupled to a network, comprising:
at least one memory;
at least one processor disposed in communication with the memory and configured to execute multiple instructions stored in the memory to:
store, in a data storage device, geolocation data received from multiple mobile devices,
wherein the geolocation data includes place data and corresponding latitude and longitude coordinate data, and
receive observation data from the multiple mobile devices, wherein the observation data includes at least two of:
device data identifying an individual mobile device;
timestamp data associated with the received observation data;
location data for the individual mobile device; and
sensor data from sensors of the individual mobile device;
generate possible place names for locations of the multiple mobile devices based on the received observation data;
provide sets of questions to individual users of the multiple mobile devices;
wherein each set of questions includes a request for a user response and includes multiple possible place names corresponding to a latitude and longitude location where one of the mobile devices is or was located;
receive, from individual users of the multiple mobile devices, place name responses to the sets of questions,
wherein each response includes a selection of one of the multiple place names for the location where the one mobile device is or was located;
store, in the data storage device, the received place name responses from the individual users in response to the sets of questions,
wherein the received place name responses are associated in the data storage device with corresponding latitude and longitude coordinate data;

utilize the place name responses to improve accuracy with which possible place names for locations of the multiple mobile devices are generated.

27. The system of claim 26, further comprising:
provide in each of set of questions the multiple place names in a predetermined order, wherein the predetermined order includes ordering the multiple place names based on an estimated accuracy.

28. The system of claim 26, wherein a place name that is an incorrect choice is included among the multiple place names to identify users that provide false data.

29. The system of claim 26, wherein the location data includes at least three of: latitude, longitude, altitude, accuracy of measurement, bearing, or speed of the mobile device.

30. The system of claim 26, wherein the sensor data includes at least one of: acceleration, magnetic orientation, proximity, light intensity, battery status, gyroscope or temperature.

31. The system of claim 26, wherein a place name that is an incorrect choice is included among the multiple place names to identify users that provide false data.

\* \* \* \* \*